(12) United States Patent
Tona et al.

(10) Patent No.: US 8,321,108 B2
(45) Date of Patent: Nov. 27, 2012

(54) METHOD OF CONTROLLING THE CLOSING PHASE OF A CLUTCH OF AN AUTOMATED AUTOMOBILE TRANSMISSION SYSTEM

(75) Inventors: Paolino Tona, Lyons (FR); Rachid Amari, Lyons (FR); Mazen Alamir, Saint-Martin-d'Heres (FR)

(73) Assignee: IFP, Cedex (FR)

( * ) Notice: Subject to any disclaimer, the term of this patent is extended or adjusted under 35 U.S.C. 154(b) by 545 days.

(21) Appl. No.: 12/495,884

(22) Filed: Jul. 1, 2009

(65) Prior Publication Data

US 2010/0010718 A1 Jan. 14, 2010

(30) Foreign Application Priority Data

Jul. 4, 2008 (FR) ...................................... 08 03822

(51) Int. Cl.
*B60W 10/02* (2006.01)

(52) U.S. Cl. ................. 701/68; 701/51; 701/55; 701/56; 701/60; 701/67; 700/28; 700/32; 700/33; 700/44; 700/45; 477/34; 477/39; 477/70; 477/74; 192/218; 192/30 R; 192/31

(58) Field of Classification Search .................. None
See application file for complete search history.

(56) References Cited

U.S. PATENT DOCUMENTS

| | | | | |
|---|---|---|---|---|
| 4,858,131 A * | 8/1989 | Sugimura et al. | ............... | 701/68 |
| 5,123,302 A * | 6/1992 | Brown et al. | ................. | 477/154 |
| 5,267,158 A * | 11/1993 | Sakaguchi et al. | ............. | 701/68 |
| 5,378,211 A * | 1/1995 | Slicker et al. | ................. | 477/175 |
| 5,598,336 A * | 1/1997 | Kume et al. | ..................... | 701/51 |
| 5,630,773 A * | 5/1997 | Slicker et al. | ................. | 477/176 |
| 5,679,099 A * | 10/1997 | Kato et al. | ..................... | 477/176 |
| 5,681,242 A * | 10/1997 | Bates | ............................. | 477/180 |
| 5,704,872 A * | 1/1998 | Kosik et al. | ..................... | 477/74 |
| 5,928,111 A * | 7/1999 | Sakakibara et al. | .......... | 477/181 |
| 5,993,355 A * | 11/1999 | Nordgård | ....................... | 477/174 |
| 6,033,341 A * | 3/2000 | Yamamoto et al. | ........... | 477/181 |
| 6,272,415 B1 * | 8/2001 | Tanaka et al. | ................... | 701/54 |
| 6,314,357 B1 * | 11/2001 | Kon et al. | ....................... | 701/67 |
| 6,364,813 B1 * | 4/2002 | Patel et al. | ..................... | 477/174 |
| 6,397,998 B1 * | 6/2002 | Wheeler et al. | ............. | 192/85.52 |
| 6,508,739 B1 * | 1/2003 | Bellinger | ......................... | 477/62 |
| 6,676,562 B1 * | 1/2004 | Bulgrien | ......................... | 477/74 |

(Continued)

FOREIGN PATENT DOCUMENTS

DE 10 2006 010 982 A1 9/2007

(Continued)

*Primary Examiner* — Jonathan M Dager
(74) *Attorney, Agent, or Firm* — Antonelli, Terry, Stout & Kraus, LLP.

(57) ABSTRACT

A method of controlling an automobile clutch in an automated transmission system with a CMPC control is disclosed having application to vehicle clutch control in an AMT system. The driver's request is translated in terms of sliding velocity $\omega_{sl}$. Constraints on the engine and clutch actuators are defined to respect their operating limits, and driving quality constraints are defined to guarantee comfort during the clutch engagement phase. In order to meet these quality constraints, a reference trajectory is defined for $\omega_{sl}$ as a function of the clutch engagement time. An analytical expression allowing real-time calculation of a set of control trajectories with a CMPC control law is then defined from the expression of this reference trajectory. The trajectory respecting the constraints on the actuators is selected from among all these control trajectories. Finally, the clutch is controlled with the selected control trajectory.

24 Claims, 2 Drawing Sheets

U.S. PATENT DOCUMENTS

| | | | |
|---|---|---|---|
| 7,549,944 B2 * | 6/2009 | Tabata et al. | 477/5 |
| 2004/0077457 A1 * | 4/2004 | Serebrennikov et al. | 477/34 |
| 2007/0278022 A1 * | 12/2007 | Tanishima | 180/65.2 |
| 2008/0195287 A1 * | 8/2008 | Janssen et al. | 701/67 |
| 2008/0288147 A1 * | 11/2008 | Cesario et al. | 701/70 |

FOREIGN PATENT DOCUMENTS

| | | |
|---|---|---|
| EP | 1 072 459 A | 1/2001 |
| FR | 2 887 606 A | 12/2006 |
| JP | 2005 117212 A | 4/2005 |

* cited by examiner

METHOD OF CONTROLLING THE CLOSING PHASE OF A CLUTCH OF AN AUTOMATED AUTOMOBILE TRANSMISSION SYSTEM

BACKGROUND OF THE INVENTION

1. Field of the Invention

The present invention relates to automatic control systems for vehicle engines. In particular, the invention relates to a method for controlling the closing phase of a clutch in an automated automobile transmission system.

2. Description of the Prior Art

Automated transmission systems, or automated manual transmission (AMT) systems, are an intermediate solution between conventional manual transmissions and automatic transmissions. Unlike the latter, characterized by complex mechanical components such as torque converters and epicyclic trains, automated transmissions use devices (clutch, gearbox) having conventional mechanics controlled not by the driver but by one or more on-board control unit(s). FIG. 1 shows a generic diagram of an automated transmission. FIG. 2 shows a conceptual diagram of an automated transmission.

Any automated transmission control system, having on-board one or more ECUs (Electronic Control Units), has to generate set points for:

(electric, pneumatic or hydraulic) control of the position of the clutch (clutch actuator);

(electric, pneumatic or hydraulic) control of the gears of the gearbox (gearbox actuator(s)), and expressing the gear change selected by the driver.

Thus, in an automated transmission, it is the ECUs dedicated to transmission control that allow responding to the driver's requests (standing start and gear shift), through the aforementioned actuators, in collaboration with the engine control ECU that determines the torque produced by the engine.

Standing start is the maneuver of setting a stationary vehicle in motion by transmitting an increasingly large fraction of the engine torque to the primary transmission shaft, therefore to the wheels, through progressive closing of the clutch. The clutch (progressively, then fully) couples the engine flywheel to the primary shaft, thus transmitting the torque produced in the engine (minus the friction of the engine crankshaft assembly) to the primary shaft. In this scheme, the clutch can therefore be:

completely open (disengaged, out of gear), with a zero torque transmitted to the primary shaft, completely closed (engaged, geared), with the engine torque fully transmitted to the primary shaft, sliding, closing or opening. It is in the closure sliding phase that progressive transmission of the engine torque to the primary shaft takes place.

In the case of a conventional manual transmission, the driver achieves progressive closing of the clutch by adjusting simultaneously the pressure exerted on the clutch pedal and the pressure exerted on the accelerator pedal. His or her experience as a driver will determine the successful outcome of the maneuver or its failure (engine stalling, over-revving, strong oscillations). In the case of an automated transmission, the clutch pedal is absent and it is the transmission control system that adjusts the action of the clutch and coordinates it with the engine torque production so as to ensure smooth progress of the standing start maneuver.

Progressive closing of the clutch and its coordination with the engine torque production thus is the key phase of the automated transmission control. To understand the operation of the powertrain in this phase, the torque transmitted by the clutch (engine torque fraction) has to be considered as a negative torque on the crankshaft side (thus decreasing the net torque provided by the engine) and as a positive torque on the transmission side downstream from the clutch, minus the transient and static losses due to elasticities, friction and the efficiency of each mechanical element. It is this torque that, geared down by the gear ratio, is transmitted to the wheels. The state of the powertrain is then defined by variables measured upstream and downstream from the clutch. Typically, the engine speed upstream, is always available on a vehicle, plus (at least) a speed measurement downstream from the clutch which is primary shaft speed, secondary shaft speed or wheel speed. These variables are not systematically measured on a standard vehicle, but they have to be measured for a vehicle equipped with an automated transmission.

In order to fulfill the main two functions of an automated transmission system, standing start and gear shift, the control systems of standard vehicles generally calculate the set point of the clutch actuator from pre-filled charts (mapping) as a function of the torque required by the driver (accelerator pedal position), the engine speed, the primary shaft speed (or other speed on the transmission side) and other parameters such as the gear ratio (in the case of gear shifting).

Regarding the engine control, the engine speed must be ensured to remain compatible with the maneuver being considered, despite the negative torque acting on the crankshaft (the engine control therefore has to increase the engine torque accordingly). From a systemic point of view, this type of control structure is but a particular case of the general structure of FIG. 3. This diagram shows that, in the control of the clutch sliding phase, there are two "levers" which are the engine torque that acts only upon the crankshaft and the torque transmitted by the clutch, which acts both on the crankshaft (as a negative torque) and on the downstream of the transmission up to the wheels. There are, for the control system, and using the Automatic terminology, two actuators that act at the input of the powertrain system. In order to know the state of the system and to act accordingly, it is necessary to measure at least two outputs, the engine speed and one of the clutch downstream speed which, for example, may be the primary shaft speed. The inputs of the powertrain system, that is the engine and clutch torques, are never measured in a standard vehicle and are only assessed, with much imprecision.

This mapping control, typical of standard vehicles, does not allow readily translating the specifications to be met during clutch closing which are compliance with the driver's requests, comfort and maintenance of powertrain smooth running. Besides, a long calibration time to fill in the maps.

In order to do without methods based on mapping, there are known solutions based on control laws inspired by the Automatic principles. These laws are no longer based only on charts that have been previously filled in. These solutions are based on algorithms that calculate the input data to be sent to the powertrain system, engine torque and clutch torque, from measurements of the state of this system (typically engine speed and primary shaft speed), designed using the feedback principle.

For these feedback control laws to be usable within the context of the engine control of a vehicle, they must allow meeting a number of specifications which respect constraints guaranteeing smooth running of the thermal engine, constraints guaranteeing comfort upon clutch engagement (no oscillation), and the driver's will.

Now, these techniques cannot explicitly manage these constraints to ensure that one or more variables of the system to be controlled (inputs, outputs or state), or their derivatives, do not exceed certain limits set as specifications.

SUMMARY OF THE INVENTION

Thus, the invention is an alternative method for real-time control of an automobile clutch in an automated transmission system which by use of a control law allows overcoming the drawbacks of prior techniques. The method therefore translates the driver's request in terms of sliding velocity $\omega_{s1}$ and of engine speed $\omega_e$, and it uses a CMPC control law to control this sliding velocity and the engine speed.

The invention is a method of controlling an automobile clutch in an automated transmission system, within a vehicle comprising an engine connected to a primary shaft via the clutch. The method comprises the following:

translating a driver's request on the accelerator pedal in terms of sliding velocity $\omega_{sl}$, defined by the difference between an engine speed $\omega_e$ and a primary shaft speed $\omega_c$;

defining constraints on actuators of the engine and of the clutch so as to respect their operating limits;

defining driving quality constraints to guarantee comfort during a clutch engagement phase;

in order to respect the quality constraints, defining a reference trajectory for the sliding velocity by defining, for each control interval, a set value $\omega_{sl}^{ref}$ for the sliding velocity as a function of a clutch engagement time $N^*_f$;

from the expression of the reference trajectory, defining an analytical expression allowing real-time calculation of a set of control trajectories for the sliding velocity, by a constrained model predictive control law (referred to as CMPC control);

selecting, from the set of the control trajectories, the trajectory that respects the constraints on the actuators by a dichotomic search technique; and controlling the clutch with the selected control trajectory.

According to the invention, the constraints on the actuators can be defined by imposing minimum and maximum values on the engine torque and on the clutch torque, as well as minimum and maximum values on the derivatives of these torques.

The quality constraints can be defined by requiring a zero sliding velocity and sliding velocity derivative during the clutch engagement phase.

According to the invention, set value $\omega_{sl}^{ref}$ can be defined for each control interval k by the following relation:

$$\forall i \in \{1, \ldots, N_p - 1\}$$

$$\omega_{sl}^{ref}(k+i) = \frac{1 - i/N_f^*}{(1 + \lambda \cdot i/N_f^*)^2} \omega_{sl}^k$$

with:
$N_p$ being an integer defining a prediction horizon; and
$\lambda$ being a parameter to be calibrated.

Parameter $\lambda$ is advantageously selected in such a way that engagement occurs with a quasi-zero sliding velocity derivative.

Finally, a second set value $\omega_{sl}^{ref}$ can be generated for the engine speed, defined by:

$$\omega_e^{ref} = \max\{\omega_e^0, T^{-1}(T_e^d(X_{Pedal}, \omega_e))\}$$

where:
$\omega_e^0$ is a constant idle set value;
T is a maximum torque depending on speed $\omega_e$;
$T_e^d$ is an engine torque required by the driver; and
$X_{Pedal}$ is a position of the accelerator pedal.

BRIEF DESCRIPTION OF THE DRAWINGS

Other features and advantages of the invention will be clear from reading the description hereafter of non limitative embodiment examples, with reference to the accompanying figures wherein.

DETAILED DESCRIPTION OF THE INVENTION

Figure 1:
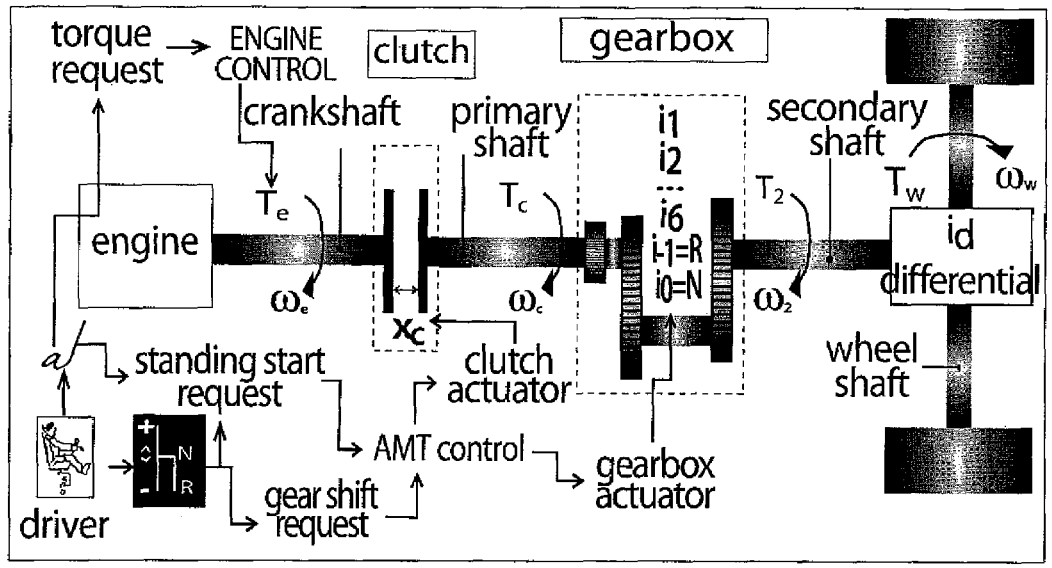
FIG. 1 shows an automated transmission generic diagram.
Figure 2:
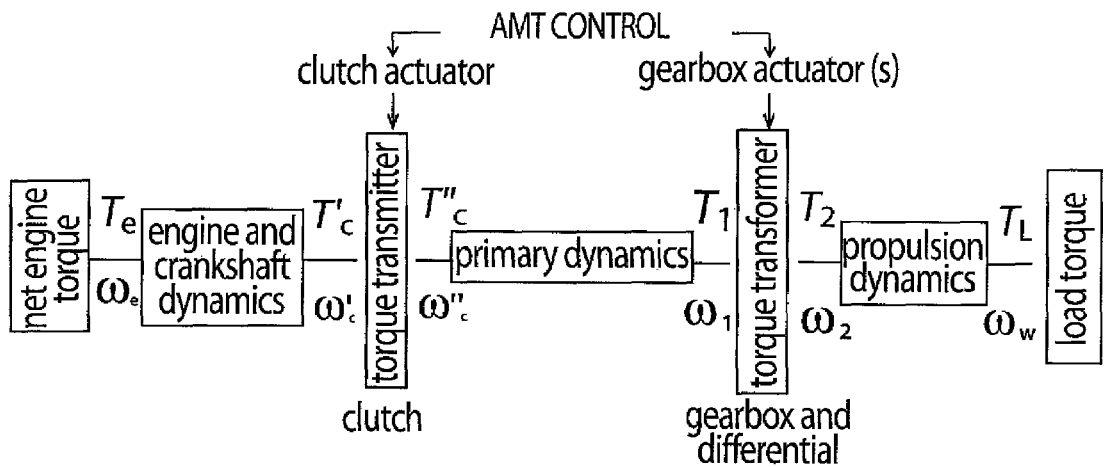
FIG. 2 shows a conceptual automated transmission diagram.
Figure 3:
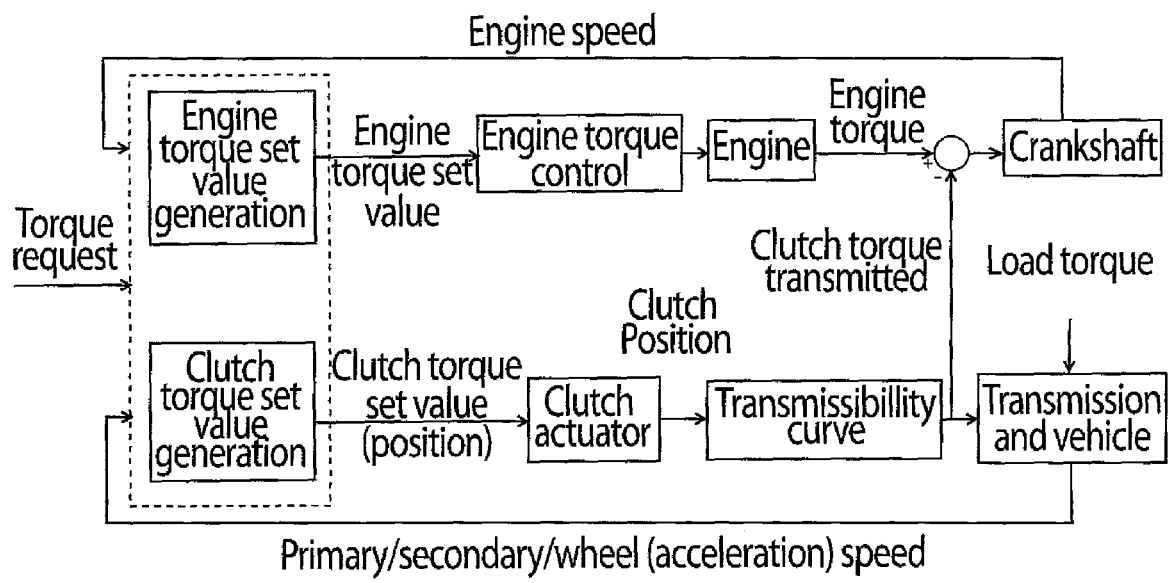
FIG. 3 illustrates a general structure of a control for the clutch sliding phase.

Progressive closing of a clutch and its coordination with the production of a given engine torque is a key phase of automated transmission control. The following points have to be ensured during this phase:

maintenance of the powertrain (the system) smooth running: no stalling, no engine over-revving;

driver's comfort: oscillation minimization upon clutch closing;

respect for the driver's request: for example, shorter standing start if one presses the accelerator pedal down harder, standing start abandoned if one releases the pedal.

According to the invention, in order to take into account these specifications in a transparent manner (for the driver), an approach based on a control law that can optimize a criterion while managing constraints is used. The technique referred to as constrained model predictive control (CMPC) described, among others, in D. Q. Mayne, J. B. Rawlings, C. V. Rao, and P. O. Scokaert, "Constrained Model Predictive Control: Stability and Optimality," Automatica, 36:789-814, 2000, is therefore used. The possibility of integrating constraints on the inputs, the outputs and the states of the system (for example minimum and maximum engine speed, clutch torque variation rate) makes this type of control particularly well suited for the technical problem of the invention.

However, the CMPC control technique, in its standard formulation, is not applicable to powertrains that have fast dynamics. In fact, to be efficient, a control system for the engine-transmission assembly must be able to calculate a new control at relatively short time intervals (some ten milliseconds maximum). The standard optimization formulation for the CMPC control does not allow carrying out this calculation in such a short time. It is not possible to use a conventional CMPC control law to perform an on-line (real-time) optimization.

According to the invention, a new approach is constructed to optimize calculation of the CMPC control within time limits compatible with the requirements of an automobile control system. It is thus possible, while integrating the specifications required for smooth running of a standing start as regards driving quality and consumption to calculate the control very rapidly in real time, with periods compatible with the calculation of power of on-board series vehicle-mounted control units; and translate the driver's will in a transparent manner.

This method of controlling in real time an automobile clutch in an automated transmission system comprises the following:

translating the driver's request in terms of sliding velocity $\omega_{sl}$, defined by the difference between engine speed $\omega_e$ and primary shaft speed $\omega_c$;

defining constraints on engine and clutch actuators so as to respect their operating limits;

defining quality constraints to guarantee comfort during a clutch engagement phase;

defining a reference trajectory for the sliding velocity;

calculating a set of control trajectories with a CMPC control law; and selecting, from all these control trajectories, the trajectory that respects the constraints on the actuators using a dichotomic search technique.

Thus, according to the invention, the specifications are met as follows:

maintenance of smooth powertrain running by applying constraints to measured variables, such as the engine speed engine speed above a minimum value, to prevent stalling and engine speed below a maximum value, to prevent over-revving;

respect for the driver's will by translating the driver's request in terms of sliding velocity $\omega_{sl}$, defined by the difference between engine speed $\omega_e$ and primary shaft speed $\omega_c$;

driver's comfort upon clutch engagement, by applying constraints to sliding velocity $\omega_{sl}$ (also referred to as sliding speed); and determination of a control law for the clutch respecting these specifications in real time, using sliding velocity $\omega_{sl}$ and engine speed $\omega_e$ as parameters to be controlled.

Before describing in detail the stages of the method, it should be recalled that a CMPC control system comprises:

1—an internal model (control model) capable of simulating the behavior of the system to be controlled more rapidly than real time;

2—a reference trajectory that defines the desired behavior in a closed loop;

3—the receding horizon principle: only the first component of the optimum control trajectory is applied, while repeating all the calculations in the next sampling interval;

4—characterization of the control trajectory by a finite number of "moves" (or other parameters); and 5—constrained on-line optimization to determine the future control strategy.

1—Definition of a Model Simulating the Behavior of the Powertrain

It defines a control model capable of simulating the behavior of the system to be controlled more rapidly than real time. According to an example, a non-linear system in the form of a discrete-time state is used as the control model:

$$\begin{cases} X_{k+1} = f(X_k, u_k) \\ y = g(X_k) \end{cases}$$

where $X \in R^n$, $\mu \in R^m$, $y \in R^q$ are respectively the state of the system, the controls (system inputs) and the system outputs (controlled variables).

In the case of clutch control:
the system controls ($U_k$) or system inputs can be:
  the engine torque set value; and
  the clutch torque set value.
The system outputs ($Y_k$) can be:
  the engine speed $\omega_e$;
  the primary shaft speed $\omega_c$;
  or another speed of the transmission directly linked with the primary shaft speed.
The system state $X_k$ can be
all the variables indicating the physical state of the powertrain (speeds or linear combinations of speeds). This state is determined by the complexity selected for the model while accounting for torsions, frictions, mechanical play.

CMPC predictive control (standard) calculates at each control period an optimum control sequence which according to the invention is calculated is a set of control sequences depending on a parameter that specifies a sliding velocity trajectory to provide a solution to a constrained optimization problem:

$$\begin{cases} J_k(\cdot) = \sum_{i=k+1}^{k+N} \begin{pmatrix} (r_k - y_k)^T Q(r_k - y_k) + \\ (u_{k-1} - u_{k-2})^T R(u_{k-1} - u_{k-2}) \end{pmatrix} \\ \quad\quad UNDER\ THE\ CONSTRAINTS \\ X_{k+1} f(X_k, u_k) \\ y = g(X_k) \\ u_k = u_{k-1} + du_k \\ X_{min} \le X_k \le X_{max} \\ \alpha_k \le u_k \le \beta_k \\ du_k^{min} \le du_k \le du_k^{max} \end{cases}$$

where e is the error between the set value and the real measurement, N the prediction horizon, Q and R are weighting matrices respectively associated with the set value-measurement errors and with the controls.

A simple model disregarding certain transmission dynamics can be selected. In this case, uncertainty terms that can be reconstructed by estimation are preferably introduced. The simplest model has the form as follows:

$$J_e \dot{\omega}_e = T_e^{SP} - T_c^{SP} + \delta_e(\cdot)$$

$$[J_c + J_{eq}(i_g, i_d)] \dot{\omega}_c = \text{sign}(\omega_{sl}) T_c^{SP} - \delta_e(\cdot)$$

where:
  $J_e$ is the inertia of the engine, the crankshaft and the clutch part on the engine side;
  $J_c$ is the inertia of the primary shaft and of the rest of the clutch;
  $J_{eq}(i_g, i_d)$ is the equivalent inertia of the transmission downstream from the clutch that depends on the engaged gear ratio $i_g$ and on the differential ratio $i_d$;
  $\omega_{sl}$ is the sliding velocity between engine and primary shaft;
  $T_e^{SP}$ is the engine torque set value that the engine control system translates into a net torque $T_e$ on the crankshaft; and
  $T_c^{SP}$ is the clutch torque set value that the clutch control system translates into a torque $T_c$ transmitted by the clutch.

The term $\delta_e(\cdot)$ brings together all the uncertainties affecting the crankshaft dynamics which is friction in the engine, errors in the engine parameters, errors in the clutch torque transmissibility curve and neglected dynamics, etc.

The terms $\delta_e(\cdot)$ and $\delta_c(\cdot)$ are reconstructed by dynamic estimation such as for example by Kalman type estimators.

More complex models can be used. However, it is always better to integrate uncertainty terms to be reconstructed in parallel with the control, through the available measurements.

2—Definition of the Constraints

Two types of constraint are defined which are the constraints on the engine and clutch actuators, denoted by $C_k^U$, and the driving quality constraints, denoted by $C_k^G$.

The constraints on the actuators, $C_k^U$ respect the engine and clutch operating limits. For example, the clutch must not transmit more than x NM torque during standing start, or the engine should not be required to produce a larger amount of torque than it can at a given speed. These constraints on the actuators are typically limitations on the maximum and minimum values of the actuator torques and their derivatives:

$$T_e \in \lfloor T_e^{min}, T_e^{min}(\omega_e) \rfloor$$

$$T_c \in \lfloor T_c^{min}, T_c^{min}(\omega_e) \rfloor$$

$$\dot{T}_e \in \lfloor \dot{T}_e^{min}, \dot{T}_e^{min}(\omega_e) \rfloor$$

$$\dot{T}_c \in \lfloor \dot{T}_e^{min}, \dot{T}_e^{min}(\omega_e) \rfloor$$

The quality constraints $C_k^G$ must first ensure that there are no oscillations upon engagement, which occurs at the time $t_f$, a condition provided by the equality of the speeds and of the accelerations upon engagement, that is, at the time $t_f$:

$$\omega_e(t_f) = \omega_c(t_f)$$

$$\dot{\omega}_e(t_f) = \dot{\omega}_c(t_f)$$

This stability condition can be ensured by constraints on the sliding velocities between the engine and the primary shaft:

$$\omega_{sl}(t_f) = 0$$

$$\dot{\omega}_{sl}(t_f) \cong 0$$

where $\omega_{sl}$ is the sliding velocity between the engine and the primary shaft. Maintaining these constraints for a sufficient time also allows ensuring stability on the rest of the transmission (equality of speeds and accelerations between primary shaft and wheels).

3—Definition of the Reference Trajectory for the Sliding Velocity

In order to respect these constraints, a reference trajectory is defined for the sliding velocity, by defining for each control interval k a set value for the sliding velocity. These values are such that the quality constraints are respected during and at the end of the clutch engagement phase.

Set values are therefore defined for the sliding velocity while seeing to it that it is cancelled out after time $t_f$. An exogenic data vector is first defined:

$$v \triangleq \begin{pmatrix} \hat{\delta} \\ N_f^* \\ X_{pedal} \end{pmatrix} \in R^2 \times R \times R \left( \triangleq \text{means «by definition»} \right)$$

where $$\hat{\delta} \triangleq (\hat{\delta}_e, \hat{\delta}_c)$$

are the outputs of the estimators, $N^*_f$ is the duration of the clutch closing phase (on which the standing start duration depends) in number of sampling intervals (therefore $N^*_f = t_f / \tau_s$, where $\tau_s$ is the sampling period) and $X_{pedal}$ is the position of the accelerator pedal.

The criterion to be minimized can then be written in the equivalent parametric form:

$$\min_{U_k \in C_k^U} J_v(U_k, X_k, r_k, \dots)$$

$N^*_f$ is a parameter to be optimized to respect the constraints on the actuators. This time is linked with a trajectory of sliding velocity $\omega_{sl}$ as detailed hereafter.

Trajectories (set of values fixed for each control interval k) $\omega_{sl}^{ref}$ of the sliding velocity are associated with the position of the accelerator pedal. This association having a direct interactivity (transparent) with the driver's wishes (during standing start). The pressure on the accelerator pedal is translated into a clutch engagement time $t_f$ and this time is used to define a sliding velocity set value $\omega_{sl}^{ref}$ of that allows providing the transmission stability condition:

$$X_{Pedal} \mapsto t_f = f(X_{Pedal}) \mapsto \omega_{sl}^{ref} = h(t, t_f)$$

Thus, according to the invention, the expression of the reference trajectory at the time k, along prediction horizon N, is as follows:

$$\forall i \in \{1, \dots, N_p - 1\}$$

$$\omega_{sl}^{ref}(k+i) = \frac{1 - i/N_f^*}{(1 + \lambda \cdot i/N_f^*)^2} \omega_{sl}^k$$

At the time $i = N^*_f$, the sliding velocity will be zero, also respecting the first constraint on the transmission stability. Parameter $\lambda$ is selected to be large enough for the engagement to take place with a sliding velocity derivative very close to zero. The second constraint on the sliding velocity is thus also respected. In practice, ☐☐☐ is sufficient.

While the sliding velocity follows the aforementioned trajectory, the engine speed has to be servo-controlled by a set value $\omega_{sl}^{ref}$ that has to be as small as possible in order to limit the consumption, but has to guarantee at the same time that the engine can produce the torque required by the driver, from the pedal torque mapping (depending on the pedal torque and on the position of the accelerator pedal), and limited by the maximum torque available at a given engine speed. This reference trajectory can be expressed as follows:

$$\omega_e^{ref} = \max \{\omega_e^0, T^{-1}(T_e^d(X_{Pedal}, \omega_e))\}$$

where:

$\omega_e^0$ is a constant idle set value,

T is the maximum torque depending on speed $\omega_e$;

$T_e^d$ is the torque required by the driver through the pedal torque map.

The above equation simply indicates that the engine speed has to be regulated at $\omega_e^0$ in case of a low torque request, that is a torque that can be produced by the engine at speed $\omega_e^0$. On the other hand, when the torque request is such that it can no longer be produced at engine speed $\omega_e^0$, set value $\omega_e^{ref}$ has to be increased to a level compatible with the request.

4—Calculation of the Optimum Control Trajectories by CMPC Control

A set of trajectories for the sliding velocity is calculated by a constrained model predictive control law referred to as CMPC control.

A quadratic optimization criterion $J(\bullet)$ depending on the state of the powertrain $X_k$, the controls $U_k$, the set values $r_k$, the constraints on the actuators $C_k^U$ and the driving quality constraints $C_k^G$ is defined:

$$\begin{cases} \min J(U_k, X_k, r_k, \ldots) \\ \text{UNDER THE CONSTRAINTS} \\ U_k \in C_k^U \\ g(X_k, U_k, \ldots) \in C_k^G \end{cases}$$

The purpose of the control system according to the invention is the control of sliding velocity $\omega_{sl}$ and engine speed $\omega_e$, respectively, by set values $\omega_{sl}^{ref}$ and $\omega_e^{ref}$ defined above. This objective can be formulated in quadratic form using the initial definition of the parametric criterion associated with the driving quality:

$$J_{\nu(k)}(U(k), \omega(k)) \triangleq \sum_{i=1}^{N} \left\| \begin{bmatrix} \omega_{sl}(k+i) - \omega_{sl}^{ref}(k+i) \\ \omega_e(k+i) - \omega_e^{ref}(k+i) \end{bmatrix} \right\|_Q^2$$

$$U(k) = [u^T(k), \ldots, u^T(k+N-1)]^T \in C^U(k) \subset R^{2N}$$

and N is the prediction horizon.

Predictions $\omega_{sl}(k+\bullet)$ and $\omega_e(k+\bullet)$ are based on the initial state $\omega(k)$, the sequence of the future controls U and the exogenous data vector v. This prediction dynamics is obtained from the control model $$J_e \dot{\omega}_e = T_e^{SP} - T_c^{SP} + \delta_e(\bullet)$$

$$[J_c + J_{eq}(i_g, i_d)]\dot{\omega}_c = \text{sign}(\omega_{sl}^{ec})T_c^{SP} - \delta_c(\bullet)$$

by introducing the sliding velocity and the engine speed as shown below:

$$\dot{\omega}_{sl}(N_f^*, X_{Pedal}) = J_e^{-1}(u_1 - u_2 + \hat{\delta}_e - J_{cw}^{-1}(i_g, i_d)^{-1}[\text{sign}(\omega_{sl})u_2 - \hat{\delta}_c]$$

$$\dot{\omega}_e = J_e^{-1}(u_1 - u_2 + \hat{\delta}_e)$$

where $u_1 = T_e^{SP}$ and $u_2 = T^{SP}$.

By writing the prediction on a horizon $N_p$ in a compact manner, the result is:

$$A_p(J_e, J_{cw}(i_g, i_d)) \cdot U = S_p(\omega(k+i), \delta(k+i), N_f^*, X_{Pedal})$$

with $H \triangleq A_p^T A_p \in R^{2N_p \times 2N_p}$, $W \triangleq S_p^T A_p \in R^{1 \times 2N_p}$.

Matrices $A_p$ and $S_p$ can be increased to take into account other specifications for the system to be controlled. It is for example possible to include an equality constraint on the engine torque desired at the clutch closing time $t_f$ to have it equal to the pedal torque required by the driver: $T_e(t_f) = T_e^d(t_f)$.

For each selection of the length of prediction horizon N, the optimum control that minimizes the non-constrained quadratic criterion is:

$$\left\{ \hat{U}_N \triangleq -H^{-1} \cdot W\left(N, \hat{\delta}, X_{pedal}, \omega_{sl}^k, \omega_e^k\right) \right\}_{N \in \{N_f, \ldots\}}$$

5—Determination of the Optimum Control Trajectory Respecting all the Constraints Among all the control trajectories obtained in the previous stage, the one respecting the constraints on the actuators is selected by means of a dichotomic search technique.

For various values of N, the optimum control is calculated starting from a nominal value $N_f = t_f(X_{Pedal})/\tau_s$ ($\tau_s$ control sampling period) and using dichotomic search to find a sliding velocity trajectory that respects the control saturation constraints and the constraint of conservation of the sign of $\omega_{sl}$: sign $(\omega_{sl}(k)) \geq \omega 0$. This sign conservation constraint allows keeping an affine control prediction model and thus to obtain an analytical solution.

Dichotomic search is possible considering that the high values of N allow going slower, with a lower torque request. This parametrization allows $\omega_{sl}$ to converge towards zero without a sign change.

Figure 4:
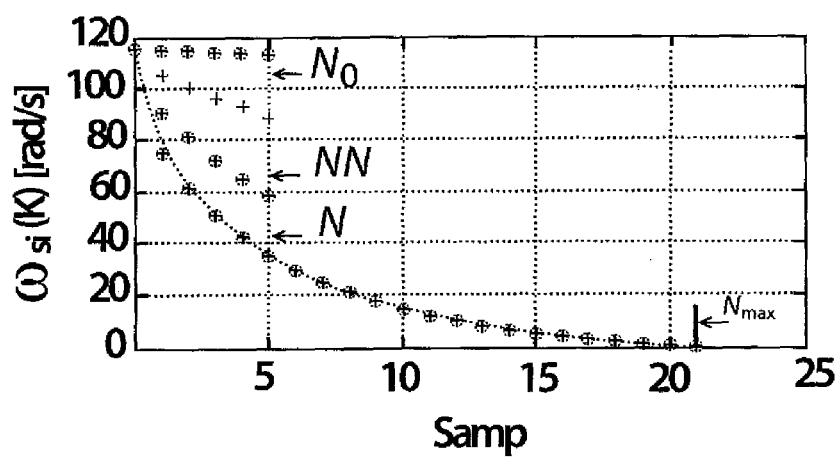
FIG. 4 illustrates the principle of a dichotomic search for the predictions for the sliding velocity respecting the constraints.

FIG. 4 illustrates the principle of dichotomic search of the predictions of the sliding velocity respecting the constraints. The sliding velocity reference is as defined before:

$$\forall i \in \{1, \ldots, N_p - 1\}$$

$$\omega_{sl}^{ref}(k+i) = \frac{1 - i/N_f^*}{(1 + \lambda \cdot i/N_f^*)^2} \omega_{sl}^{ref}(k)$$

In FIG. 4, the duration of the clutch sliding phase, required by the clutch pedal, is assumed to be 1 s, which gives, with a 50-ms sampling period, a value of $N_f^*$ equal to 21 samples (Samp) denoted by $N_{max}$ in FIG. 4. The dichotomic search is carried out on a fixed sliding prediction horizon of 5 samples in this example. In this horizon, a set of trajectories parametrized by an integer NN that is varied between a minimum value N that identifies the trajectory that an engagement time equal to $N_f^*$ would eventually give and a very large maximum value, that will definitely meet all the constraints, is calculated. In this set of trajectories, it is found, by dichotomic search which is the one corresponding to the smallest value NN respecting the constraints.

Thus, by defining a set value for the sliding velocity, as a function of the clutch engagement time $N_f^*$, the prediction model is control-affine, since $\omega_{sl}^{ref}$ does not change its sign along a prediction (and, more generally, along any standing start). It is therefore possible to convert the initial criterion $$J_{\nu(k)}(U(k), \omega(k)) \triangleq \sum_{i=1}^{N} \left\| \begin{bmatrix} \omega_{sl}(k+i) - \omega_{sl}^{ref}(k+i) \\ \omega_e(k+i) - \omega_e^{ref}(k+i) \end{bmatrix} \right\|_Q^2$$

to be solved under constraint to an equivalent criterion $$J_{\nu(k)}(U, \ldots) = U^T \cdot H(J_e, J_{cw}(i_g, i_d)) \cdot U + 2[W(\hat{\delta}, N_f^*, X_{Pedal}, \omega_e^k)] \cdot U$$

that is a function of parameter $N_f^*$.

Now, the solution is obtained analytically (therefore through a calculation that poses no real-time problem):

$$\left\{ \hat{U}_N \triangleq -H^{-1} \cdot W\left(N, \hat{\delta}, X_{pedal}, \omega_{sl}^k, \omega_e^k\right) \right\}_{N \in \{N_f, \ldots\}}$$

Parameter $N_f^*$ then just has to be varied to seek the solution with $N_f^*$ being minimal to bring controls $U_n$ into the constraint space (allowable solution with $N_f^*$ minimal). If this search is performed by dichotomy, the cost in terms of calculation remains limited and therefore compatible with real time (the driving quality constraints are respected thanks to the "shape" of the sliding velocity trajectory).

The invention thus allows real-time control while using CMPC control.

The invention claimed is:

1. A method of controlling an automobile clutch in an automated transmission system within a vehicle comprising an engine connected to a primary shaft via the clutch, comprising:
   translating a driver's request on an accelerator pedal in terms of sliding velocity $\omega_{sl}$, defined by a difference between engine speed $\omega_e$ and primary shaft speed $\omega_c$;
   defining constraints on engine and clutch actuators regarding operating limits;
   defining driving quality constraints to guarantee comfort during a clutch engagement phase;
   respecting the driving quality constraints by defining a reference trajectory for the sliding velocity by defining, for control intervals, a set value $\omega_{sl}^{ref}$ for the sliding velocity as a function of a clutch engagement time $N^*_f$;
   from an expression of the reference trajectory, defining an analytical expression allowing real-time calculation of a set of control trajectories for the sliding velocity, by a constrained model predictive control law;
   selecting, with a dichotomic search from the set of the control trajectories for the sliding velocity, a control trajectory that respects constraints on the actuators; and
   controlling the clutch with the selected control trajectory for the sliding velocity.

2. A method as claimed in claim 1, wherein the constraints on the actuators are defined by imposing minimum and maximum values on engine torque and on clutch torque and minimum and maximum values on derivatives of the engine torque and the clutch torques.

3. A method as claimed in claim 1, wherein the driving quality constraints are defined by requiring a zero sliding velocity and zero derivative during a clutch engagement phase.

4. A method as claimed in claim 2, wherein the driving quality constraints are defined by requiring a zero sliding velocity and a zero sliding velocity derivative during a clutch engagement phase.

5. A method as claimed in claim 1, wherein set value $\omega_{sl}^{ref}$ is defined for each control interval k by:

$$\forall i \in \{1, \ldots, N_p - 1\}$$
$$\omega_{sl}^{ref}(k+i) = \frac{1 - i/N_f^*}{(1 + \lambda \cdot i/N_f^*)^2} \omega_{sl}^k$$

wherein $N_p$ is an integer defining a prediction horizon and $\lambda$ is a parameter to be calibrated.

6. A method as claimed in claim 2, wherein set value $\omega_{sl}^{ref}$ is defined for each control interval k by:

$$\forall i \in \{1, \ldots, N_p - 1\}$$
$$\omega_{sl}^{ref}(k+i) = \frac{1 - i/N_f^*}{(1 + \lambda \cdot i/N_f^*)^2} \omega_{sl}^k$$

wherein $N_p$ is an integer defining a prediction horizon and $\lambda$ is a parameter to be calibrated.

7. A method as claimed in claim 3, wherein set value $\omega_{sl}^{ref}$ is defined for each control interval k by:

$$\forall i \in \{1, \ldots, N_p - 1\}$$
$$\omega_{sl}^{ref}(k+i) = \frac{1 - i/N_f^*}{(1 + \lambda \cdot i/N_f^*)^2} \omega_{sl}^k$$

wherein $N_p$ is an integer defining a prediction horizon and $\lambda$ is a parameter to be calibrated.

8. A method as claimed in claim 4, wherein set value $\omega_{sl}^{ref}$ is defined for each control interval k by:

$$\forall i \in \{1, \ldots, N_p - 1\}$$
$$\omega_{sl}^{ref}(k+i) = \frac{1 - i/N_f^*}{(1 + \lambda \cdot i/N_f^*)^2} \omega_{sl}^k$$

wherein $N_p$ is an integer defining a prediction horizon and $\lambda$ is a parameter to be calibrated.

9. A method as claimed in claim 5, wherein $\lambda$ is selected so that engagement occurs with a quasi-zero sliding velocity derivative.

10. A method as claimed in claim 6, wherein $\lambda$ is selected so that engagement occurs with a quasi-zero sliding velocity derivative.

11. A method as claimed in claim 7, wherein $\lambda$ is selected so that engagement occurs with a quasi-zero sliding velocity derivative.

12. A method as claimed in claim 8, wherein $\lambda$ is selected so that engagement occurs with a quasi-zero sliding velocity derivative.

13. A method as claimed in claim 1, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
$\omega_e^0$ is a constant idle set value;
T is a maximum torque depending on speed $\omega_e$;
$T_e^d$ is an engine torque required by a driver; and
$X_{Pedal}$ is a position of the accelerator pedal.

14. A method as claimed in claim 2, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
$\omega_e^0$ is a constant idle set value;
T is a maximum torque depending on speed $\omega_e$;
$T_e^d$ is an engine torque required by a driver; and
$X_{Pedal}$ is a position of the accelerator pedal.

15. A method as claimed in claim 3, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
$\omega_e^0$ is a constant idle set value;
T is a maximum torque depending on speed $\omega_e$;
$T_e^d$ is an engine torque required by a driver; and
$X_{Pedal}$ is a position of the accelerator pedal.

16. A method as claimed in claim 4, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
$\omega_e^0$ is a constant idle set value;
T is a maximum torque depending on speed $\omega_e$;
$T_e^d$ is an engine torque required by a driver; and
$X_{Pedal}$ is a position of the accelerator pedal.

17. A method as claimed in claim 5, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

18. A method as claimed in claim 6, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $w_e$;
- $T_e^d$ is an engine torque required by a driver; and
- $X_{Pedal}$ is a position of the accelerator pedal.

19. A method as claimed in claim 7, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

20. A method as claimed in claim 8, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

21. A method as claimed in claim 9, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

22. A method as claimed in claim 10, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega^{ref}$ is a constant idle set value;
- T is a maximum torque depending on speed $\omega_e$;
- $T_e^d$ is an engine torque required by a driver; and
- $X_{Pedal}$ is a position of the accelerator pedal.

23. A method as claimed in claim 12, wherein a second set value $\omega_{sl}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

24. A method as claimed in claim 11, wherein a second set value $\omega_{st}^{ref}$ is generated for the engine speed, defined by:

$$\omega_e^{ref} = \max\{\omega_e^0, T^{-1}(T_e^d(X_{Pedal}, \omega_e))\}$$

where:
- $\omega_e^0$ is a constant idle set value;
- T is a maximum torque depending on speed $\omega_e$;
- $T_e^d$ is an engine torque required by a driver; and
- $X_{Pedal}$ is a position of the accelerator pedal.

* * * * *